(Model.)
J. J. MORRIS.
CULTIVATOR.
No. 264,554.   Patented Sept. 19, 1882.
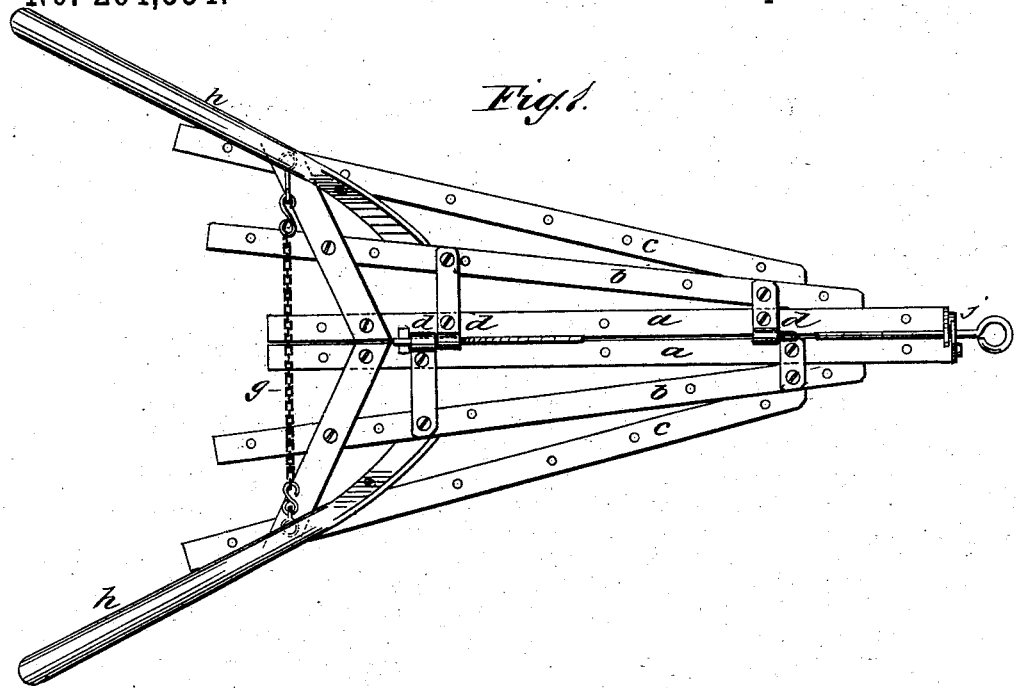
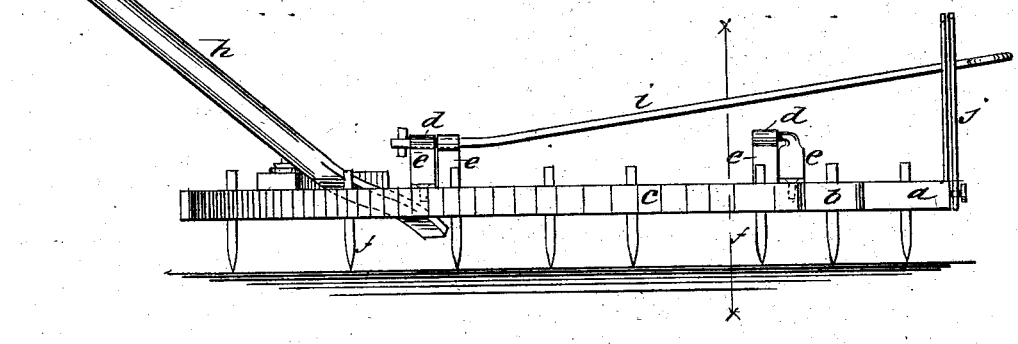
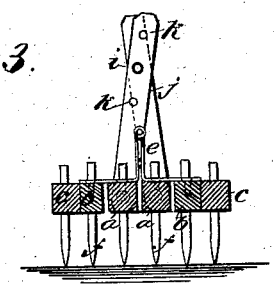
WITNESSES:
Francis McArdle
C. Sedgwick
INVENTOR:
J. J. Morris
BY Munn & Co
ATTORNEYS.

UNITED STATES PATENT OFFICE.

JOHN J. MORRIS, OF HUMBOLDT, NEBRASKA.

CULTIVATOR.

SPECIFICATION forming part of Letters Patent No. 264,554, dated September 19, 1882.

Application filed July 14, 1882. (Model.)

*To all whom it may concern:*

Be it known that I, JOHN J. MORRIS, of Humboldt, in the county of Richardson and State of Nebraska, have invented a new and Improved Cultivator, of which the following is a full, clear, and exact description.

My invention consists in an improvement in cultivators designed for cultivating corn planted in what is known as the "listing process," which consists of plowing a wide furrow with a double-mold-board plow, subsoiling the furrow, and planting the corn in the furrow of ten or twelve inches deep.

My improvement in cultivators relates to a cultivator divided along the middle longitudinally, and jointed together, so as to allow the sides to rise at an angle of sixty to eighty degrees, according to the inclinations of the sides of the furrows in which the corn is planted, so that the teeth will straddle the corn and pulverize the sides of said furrows, and provided with a chain for connecting and holding the said parts at the angle required, as hereinafter fully described.

Reference is to be had to the accompanying drawings, forming part of this specification, in which similar letters of reference indicate corresponding parts in all the figures.

Figure 1 is a plan view of my improved cultivator. Fig. 2 is a side elevation, and Fig. 3 is a transverse section on the line $xx$ of Fig. 2.

The cultivator is made in the ordinary taper or $\wedge$ shape, and constructed in two parts, each consisting of three bars, $a\ b\ c$, more or less, as preferred; but in my arrangement the bars $a$ are placed side by side, and they are jointed together by the vertically-extended hinges $d$, which, being projected above the bars $a$ by the long leaves or bars $e$ of the hinges, as shown in Fig. 2, allow the teeth $f$, Fig. 3, carried by said bars $a$, to separate, so as to straddle the corn when the outer edges of the cultivator are raised up to the angle of sixty to eighty degrees, as above stated, to correspond with the angles of the sides of the furrows.

The chain $g$, attached to the two parts of the cultivator, as shown in Fig. 1, secures the parts in the required positions, the chain being adapted to take up or let out, according to the angle desired.

The handles $h$ are arranged more widely flaring than ordinarily, so that when the parts are hitched up by the chain in the working position the handles will be about the same as the handles of other cultivators with respect to their distance apart.

In order to hitch on the team so as to draw the cultivator properly down in the furrow while the horses travel on the ridges between the furrows, the hitching-rod $i$ is elevated in the $\wedge$-bars $j$, at the front end of the cultivator, as shown, and extended downward and rearward therefrom to the rear joint, $d$, of the two sections, and it forms the pivot thereof. The said bars $j$ are respectively attached to the two parts of the cultivator at the front end and arranged to cross each other near the upper end, where the rod $i$ passes through them for being supported by them, and it serves as a pivot on which the bars may swing as the two sides of the cultivator are adjusted on its hinges $d$. The said bars are provided with a series of holes, $k$, to enable the rod $i$ to be shifted higher or lower, as may be required.

In case it may be desired to use the cultivator on level ground, the chain $g$ may be disconnected to allow the cultivator to conform thereto, when it will work the same as others of common form.

I propose to make the handles adjustable as to their distance apart, so that they can be shifted to suit the different conditions of the harrow, as when working in a furrow or on level ground.

Having thus fully described my invention, I claim as new and desire to secure by Letters Patent—

In a cultivator, the wings $a\ b\ c$, connected by upwardly-extended long-leaved hinges $d\ e$, in combination with a draft-rod, $i$, elevated on bars $j$ and extended back to form the pintle of the hinges, as shown and described.

JOHN J. MORRIS.

Witnesses:
J. K. LIGGETT,
E. S. NORTON.